(12) United States Patent
Hosking (10) Patent No.: US 7,440,647 B2
(45) Date of Patent: Oct. 21, 2008

(54) INTEGRATED OPTICAL ASSEMBLY

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 65 days.

(21) Appl. No.: 10/828,724

(22) Filed: Apr. 21, 2004

(65) Prior Publication Data

US 2005/0078916 A1   Apr. 14, 2005

Related U.S. Application Data

(60) Provisional application No. 60/509,932, filed on Oct. 9, 2003.

(51) Int. Cl.
*G02B 6/00* (2006.01)
*G02B 6/12* (2006.01)
*G02B 6/36* (2006.01)

(52) U.S. Cl. .............................. 385/14; 385/12; 385/13; 385/88; 385/89; 385/90; 385/91; 385/92; 385/93; 385/94

(58) Field of Classification Search ............. 385/12–14, 385/88–94
See application file for complete search history.

(56) References Cited

U.S. PATENT DOCUMENTS

| 5,337,396 | A * | 8/1994 | Chen et al. ................... 385/92 |
| 6,665,497 | B1 * | 12/2003 | Hamilton-Gahart et al. . 398/135 |
| 6,985,645 | B2 * | 1/2006 | Cohen et al. .................. 385/14 |
| 2002/0196501 | A1 * | 12/2002 | Buss et al. .................. 359/152 |
| 2003/0085452 | A1 * | 5/2003 | Brezina et al. .............. 257/666 |

FOREIGN PATENT DOCUMENTS

| WO | WO 02/063800 A1 * | 8/2002 | ................. 359/152 |
| WO | WO02063800 A1 * | 8/2002 | ................. 359/152 |

OTHER PUBLICATIONS

Documentation entitled "Interfacing Maxim Laser Drivers with Laser Diodes", dated Sep. 1, 2000, Maxim High-Frequency/Fiber Communications Group, first appeared *Lightwave* magazine, Aug. 2000.
Article entitled "IBM Solutions for a Multi-Gbps World", by Michael W. Marlowe and William Charuk, *MicroNews*, Second Quarter 2001, vol. 7, No. 2.
Documentation entitled "I²C Bus Solutions, I²C Bus Basics", dated Jun. 2002, Philips.

* cited by examiner

*Primary Examiner*—Frank G Font
*Assistant Examiner*—Jerry Blevins
(74) *Attorney, Agent, or Firm*—Workman Nydegger (57) ABSTRACT

An integrated fiber optic assembly includes some of the active components that are otherwise found in a typical transceiver. For example, a transmitter optical assembly includes a laser source, a laser driver, and a component for administering diagnostic data. A receiver optical assembly includes a photo-diode an optical converter, such as a transimpedance amplifier, and a processing control that can administer, for example diagnostic data associated with the receiver optical assembly. A combination optical assembly includes a photo-diode and a laser source, as well as many of the active components for driving, operating, or administering the laser source. In part since the active components can be placed in close proximity to each other, electrical impedance is reduced that would otherwise be present in a typical transceiver and optical subassembly.

28 Claims, 5 Drawing Sheets

INTEGRATED OPTICAL ASSEMBLY

CROSS-REFERENCE TO RELATED APPLICATIONS

This invention claims priority to provisional patent application Ser. No. 60/509,932, entitled "INTEGRATED OPTICAL ASSEMBLY", filed on Oct. 9, 2003, which is incorporated herein in its entirety by reference.

BACKGROUND OF THE INVENTION

1. The Field of the Invention

The invention generally relates to systems and apparatus for overcoming discontinuities present in conductive pathways on optical transceivers.

2. The Relevant Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmitting node to a receiving node. Generally, optical transceivers implement both data signal transmission and reception capabilities. A transmitter portion of a transceiver converts an incoming electrical data signal into an optical data signal, while a receiver portion of the transceiver converts an incoming optical data signal into an electrical data signal.

Figure 1:
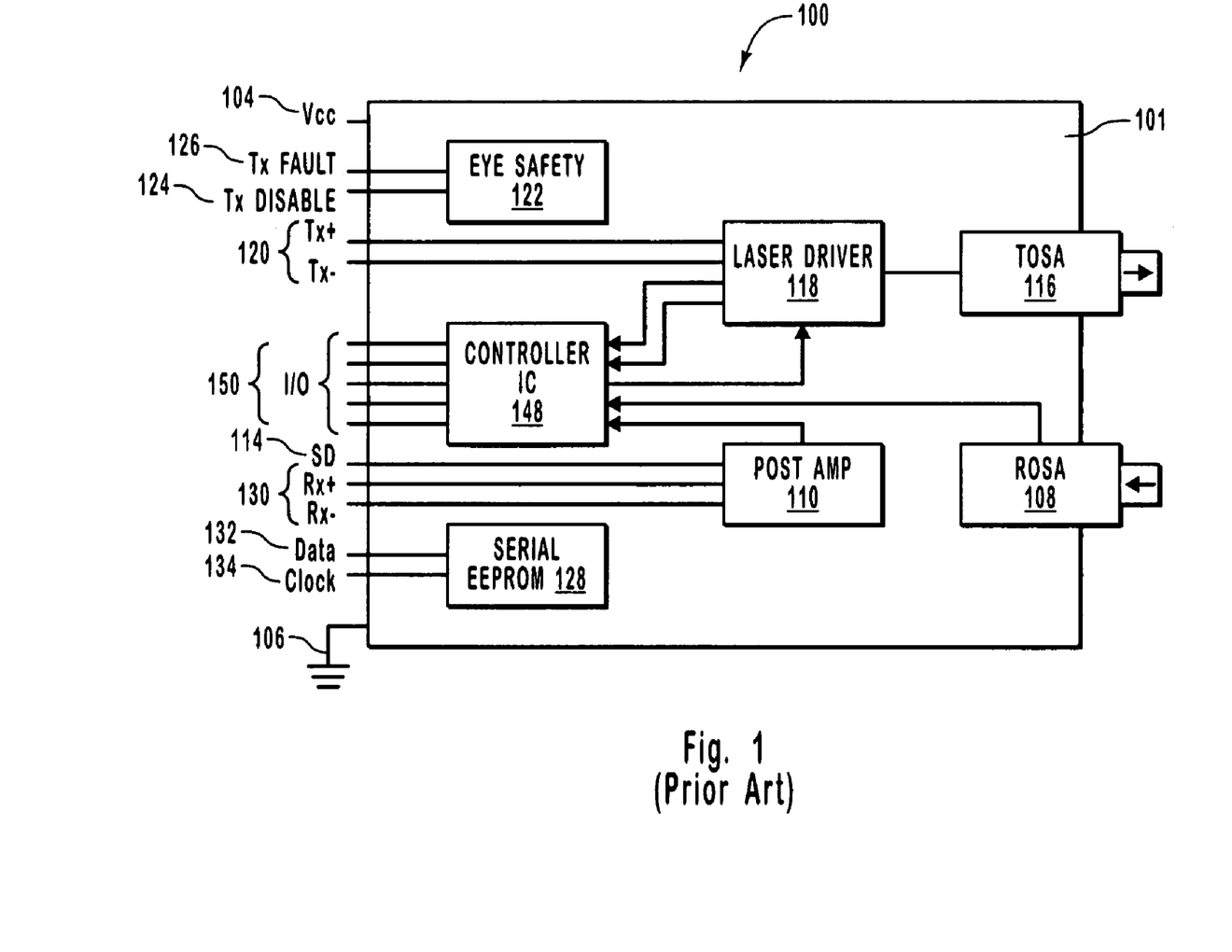
FIG. 1 illustrates a prior art circuit board having one or more components that can operate one or more optical assemblies, such as a TOSA, a ROSA, or both.

Depicted in FIG. 1 is an optical transceiver 100, which can transmit and receive modulated optical data. Transceiver 100 includes active and/or passive circuitry components connected to, or mounted on, a substrate 101 (e.g., a printer circuit board or "PCB"), the circuitry component being designed to implement transmitting and receiving functionality. For example, Transmitter Optical Subassembly ("TOSA") 116 and Receiver Optical Subassembly ("ROSA") 108 can be mounted on substrate 101 or connected to substrate 101 through a flex circuit. TOSA 116 further includes an optical signal source, such as, for example, a laser diode or Light Emitting Diode ("LED"), for generating modulated optical data. ROSA 108 includes a photodetector, such as, for example, a photodiode, for detecting modulated optical data.

Other active and/or passive circuitry components mounted on substrate 101 are designed to interoperate with TOSA 116 and ROSA 108 to facilitate transmitting and receiving modulated optical data. For example, optical transceiver 100 can also include eye safety component 122, controller integrated circuit ("IC") 148, laser driver 118, post-amplifier 110, and memory components such as EEPROM 128, and so forth. Optical transceiver 100 can also interface with external conductive pathways through appropriate connections. For example, optical transceiver 100 can interface with an electrical transmit pathway (Tx+ and Tx− 120), an electrical receive pathway (Rx+ and Rx− 130), power connection 104, ground connection 106, etc.

Referring to transmitting modulated optical data, transceiver 100 receives a digital electronic input signal and converts the digital electronic input signal to an equivalent modulated optical signal. More specifically, laser driver 118 receives a digital electronic input signal received through TX+ and TX− 120 pathways (e.g., from pins connected to a computer system (not shown)). Based on the received digital electronic input signal, laser driver 118 drives the light source included in TOSA 116 to generate an equivalent modulated optical signal. Laser driver 118 includes an alternating current ("AC") driver to provide AC current to the light source as well as a direct current ("DC") driver to provide bias current to the light source Referring to receiving modulated optical data, transceiver 100 receives a modulated optical signal converts the modulated optical signal to an equivalent digital electronic output signal. More specifically, the photodetector included in ROSA 108 receives a modulated optical signal and converts the modulated optical signal to an electrical signal. A preamplifier in ROSA 108 amplifies the converted electrical signal such that post amp 110 can detect and process the converted electrical signal. Post amp 100 amplifies and limits the converted electrical signal to generate a digital electronic output signal. The digital electronic output signal can have a uniform amplitude (or fixed swing) digital electronic output signal. The digital electronic output signal is presented at RX+ and RX− 120 conductive pathways (e.g., from pins connected to the computer system).

Post amp 110 can also provide a digital output signal known as Signal Detect ("SD"), or Loss of Signal ("LOS"), indicating the presence or absence of a suitably strong optical input. This SD output is provided via a SD output pin 114. Transceiver 100 can further include a controller IC 148 that, in conjunction with input/output ("I/O") pins 150 (and associated circuitry), can provide certain functions to, for example, the post-amp 110 and laser driver 118.

In addition, some optical transceiver standards require additional transceiver functionality. For example, the GigaBit Interface Converter ("GBIC") standard specifies the implementation of eye safety and general fault detection functionality. This functionality may be integrated into the laser driver IC 118 itself or into an optical eye safety IC 122. To enable this functionality, TX disable 124 and TX fault 126 pins are provided. The TX disable pin 124 allows the TOSA 116 to be shut off by a host, while the TX fault pin 126 communicates a fault condition in the laser, or associated laser driver IC 118, to the host device. In addition to this basic description, the GBIC standard includes a series of timing diagrams describing how these controls function and interact with each other to implement reset operations and other actions. The GBIC standard also defines the use of an electrically erasable programmable read-only memory ("EEPROM") 128 to store standardized serial identification ("ID") information that can be read via a serial interface consisting of clock 134 and data 132 lines.

Thus transmitting and receiving modulated optical data and performing related functionality requires that electrical signals be transferred along conductive pathways (also referred to herein as "conductor") that interconnect the electrically conductive components of transceiver 100. Transferring an electrical signal through the several different conductive components on a conductive pathway can result in mismatched electrical impedances due to "discontinuities" between the different conductive components. Generally, a "discontinuity" is an element or region along a conductive pathway (e.g., a series of interconnected conductive components) that represents a change in shape of the conductive path. For example, a change in shape can occur when an electrical signal passes over one or more solder points on the conductive path between the laser driver 118 and the TOSA 116, over a junction from a PCB trace to a connector pin pad, from a bond wire to a lead frame or ball grid array substrate, and so forth.

At least one problem that a discontinuity presents is that each discontinuity in a conductive pathway causes at least a portion of a given electronic signal to reflect back onto the electrical signal, thereby disrupting the electrical signal. Reflections resulting from discontinuities can distort the rising and falling edges of electrical signals representing data bits such that the edges of the data bits no longer rise or fall as predicted. This distortion causes the data bits to move out of position, causing the data bits to arrive at the appropriate components out of order, such as arriving slightly earlier or slightly later than expected. This can cause the remaining data bits that arrive at the appropriate components at the appropriate time to be unintelligible. It may even be that a reflection is strong enough to make the top or bottom data bit bounce through a threshold at a receiver, causing data errors.

Reflections such as these can occur at varying degrees in a conductive pathway since there are a wide variety of possible discontinuities. In particular, the larger and more abrupt the discontinuity, the more power that is required to pass the electronic data signals through the given discontinuities from one point to the next. Hence, one conventional method for overcoming discontinuities is by adding power to the electrical signals. While this can work in low frequency systems that have relatively low energy requirements, systems that pass higher frequency data signals may not necessarily benefit from simply adding power to the signal. In particular, while simply adding power to a higher frequency electrical signal (e.g., an electrical signal representing data bits) can increase the amplitude of the electrical signal, the higher frequency data may be no more intelligible than before amplification.

Other conventional methods of overcoming reflections include adding impedance matching components along a conductive pathway. Generally, matching components are designed to reduce or eliminate reflections that occur by turning the reflections into heat in a resistor. Ideally, reducing the reflections to heat allows the electronic signal to pass through discontinuities without significantly muddying the data. Unfortunately, matching components require added power to operate effectively, and, moreover, reduce the amplitude of the electronic data signal in the process.

Furthermore, discontinuities can present a special problem to systems implementing high frequency data transmissions. For example, discontinuities tend to have greater significance when the length of the conductive pathway is much greater than the wavelength of the electrical signal representing the high speed data. By contrast, discontinuities tend to have less significance when the length of a given conductive pathway is much less than the electrical signal's wavelength. At 2.5 gigabits per second, for example, one electrical signal wavelength is approximately 6 cm. At 10 gigabits per second, the electrical signal wavelength is approximately 1-1.5 cm. This means that any conductive pathway longer than 1-1.5 mm (roughly 1 tenth of 1.5 cm) presents a particular problem for electrical signals representing data transmission in the 10 gigabit per second range.

Accordingly, an advantage can be realized with systems and methods that minimize the effect of discontinuities that can otherwise occur in data transmissions, particularly high-speed fiber optic data transmissions. In particular, compact systems that can minimize the distance of a high frequency conductive pathway, while consuming lower amounts of power would be an advantage in the present art.

BRIEF SUMMARY OF THE INVENTION

Exemplary implementations of the present invention are directed to systems, apparatus, and methods for integrating multiple transceiver components into an optical assembly, such as a TOSA, a ROSA, or combined transmitter/receiver optical assembly. More particularly, the present invention provides for placing conductive components into a compact optical sub-assembly package in order to minimize various electrical discontinuities between conductive components.

Generally, compact components and/or modules (e.g., Small Form Factor and Small Form Factor Pluggable components) in accordance with aspects of the present invention allow for close proximity between respective components. Other exemplary implementations allow for a reduction in the number of conductive pathways between a computerized system and a transceiver OSA. Accordingly, the present invention can significantly reduce the impedance mismatch between respective conductive components. Reducing impedance mismatches correspondingly reduces the need for matching components as well as the power otherwise needed to amplify and match impedance of transmissions and receptions along a conductive path. In at least one implementation, the integrated transmitter, or receiver, or combined optical assembly can eliminate the need for a separate transceiver, which further allows for more efficient, more compacted fiber optic systems.

For example, in one exemplary implementation, an assembly package (e.g., a TOSA) includes a laser source such as an LED, or, alternatively, a laser diode, placed on a transmitter substrate. The exemplary assembly package also includes a laser control unit mounted on the transmitter substrate, where the laser control unit is operably connected to a laser source, as well as power and transmission/reception lines from a host. In one embodiment, the exemplary assembly package can connect to the host as an edge connector. The exemplary assembly package can include one or more components for administering a laser source such as a modulator component, a bias component, a temperature component, a status and fault component, and one or more memory components. The laser control unit in turn can connect directly to the laser source using a conductive path that includes bond wires, rather than circuit traces. Similar embodiments of other exemplary assembly packages are described for receiver and combination transmitter/receiver optical assemblies.

Since a single optical assembly package, as described herein, can include one or more conventional transceiver components in a compact space, the distance between conductive components (as well as the number of connections between conductive components) is significantly reduced. This in turn reduces the number and significance of possible discontinuities on a given conductive pathway.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 2A:
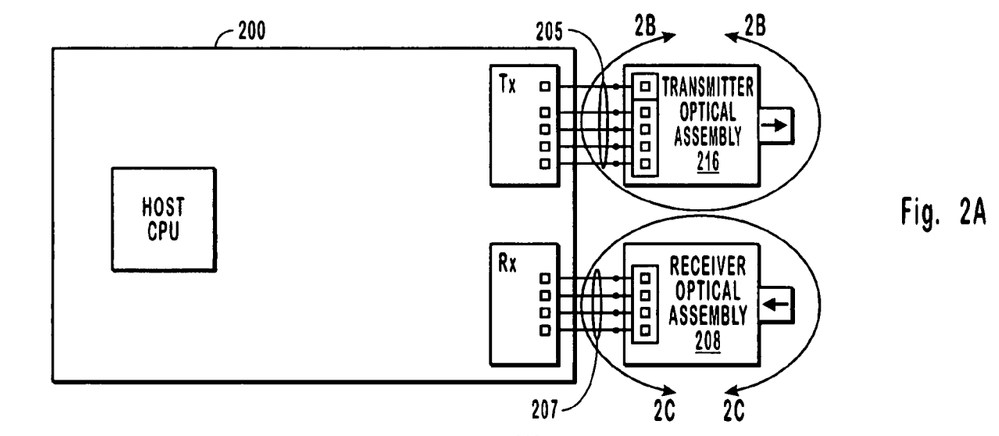
FIGS. 2A-2C illustrate embodiments of the present invention where one or more of the components that can operate one or more optical assemblies are mounted inside the respective optical assembly.

FIG. 2A illustrates a schematic overview for practicing at least one embodiment of the present invention. In contrast with the prior art shown in FIG. 1, FIG. 2A shows a direct connection between an optical assembly such as a transmitter assembly 216 or a receiver assembly 208 and a host 200. In particular, the present invention can allow total removal of a transmitter, receiver, or transceiver IC component since much or all of the active and/or passive circuitry otherwise used to drive a respective transmitter, receiver, or transceiver IC optical component is placed substantially within what would otherwise be the TOSA, ROSA, or combined OSA.

Accordingly, the term TOSA, ROSA, or OSA is not limited to a "subassembly" that is mounted on an IC, such as a transceiver IC, etc. For example, in some cases the specific optical component may or may not be separately "sub-assembled", such as onto a transmitter, receiver, or combination transmitter/receiver substrate IC. Thus, for example, the term TOSA can include a transmitter optical assembly in addition to a transmitter optical subassembly. This construction also applies equally to the terms ROSA, and OSA, as appropriate, whether the respective optical component is actually "sub-assembled" on a separate transmitter, receiver, or combination substrate IC.

Figure 2B:
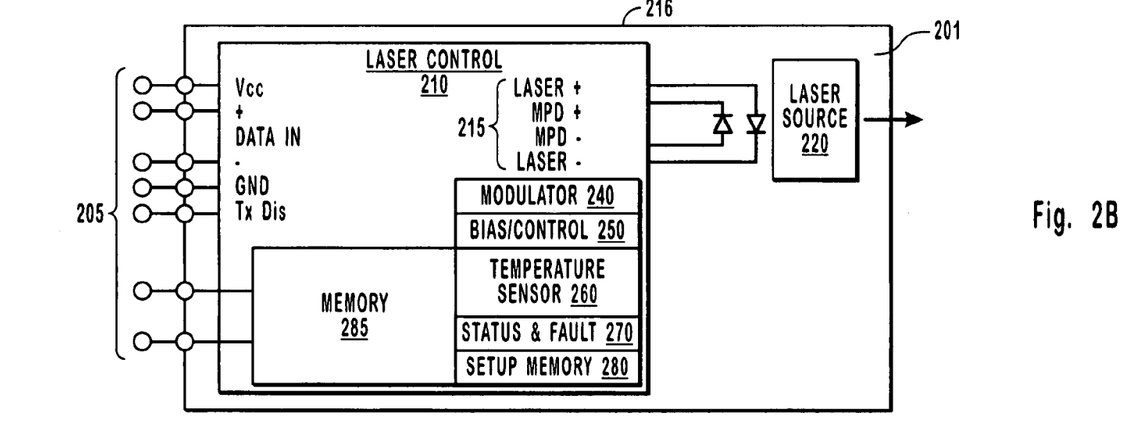

FIG. 2B is an expanded schematic diagram of the transmitter assembly 216 shown in FIG. 2A, in accordance with at least one embodiment of the present invention. In the illustrated embodiment, a transmitter optical assembly (e.g., a transmitter assembly 216) includes a laser source 220 such as an LED placed on a transmitter substrate 201. The substrate can be any type of Integrated Circuit ("IC"), though Small Form Factor ("SFF") and Small Form Factor Pluggable ("SFP") circuitry can be particularly applicable. In at least one preferred embodiment, the substrate can be composed primarily of ceramic material that has been molded for embedded metallic circuit traces, and wherein the metallic circuit traces are enclosed in three-dimensional metallic sputtering. A ceramic circuit board configured in this manner can be particularly useful for shielding Electro-Magnetic Interferences ("EMI").

The transmitter assembly also includes a laser control unit 210 mounted on the transmitter substrate, where the laser control unit 210 is operably connected to the laser source 220, as well as power and transmission/reception lines 205 from a host (e.g., 200). In one embodiment, the transmitter optical assembly can connect to the host as an edge connector. For example, the transmitter assembly 216 can include electrically conductive pins that allow a fitted, slidable connection with another component, such as in the case of a typical Peripheral Component Interconnect ("PCI"3) card that is connected to a host's motherboard.

The laser control unit 210 can include one or more components for administering the laser source 220 such as a modulator component 240, a bias component 250, a temperature component 260, a status and fault component 270, and one or more memory components (e.g., 280, 285). The modulator component 240 can be geared primarily toward delivering an Alternating Current ("AC") to the laser source 220, whereby the current supplied can, for example vary according to certain, preset temperature values. For example, a temperature component 260 can sense the operating temperature of the laser diode 220. A temperature table that can be stored in the memory component (e.g., 280, 285) can indicate to the modulator component 240 what current to apply to the laser diode 220 so that the laser diode 220 has a constant output. As well, the modulator component 240 may be preset to supply a specific current to the laser diode 220 based on whatever temperature is indicated at the temperature sensor 260.

In contrast with the modulator component 240, the bias component 250 can be configured to supply a Direct Current ("DC") to the laser diode 220. Typically, the bias current can also be varied to a certain extent, though it is generally used to provide a constant power source to the laser diode 220. In one embodiment, the bias component 250 and modulator component 240 can compensate for temperature variation using a lookup table. In addition, the status and fault component 270 can be configured in at least one embodiment to immediately shut off the laser diode 220 under certain circumstances, without requiring a separate request from the host, such as through the transmission disable ("Tx Dis") line in item 205. In at least one embodiment, the status and fault component 270 is not included in the transmitter assembly 216.

The one or more memory components can include a single memory that is subdivided into, for example, a memory portion 285 dedicated for receiving and storing diagnostic data, and a memory portion 280 that can be dedicated to receiving and storing setup memory. In addition, any or all of the memory components can include an Electrically Erasable Programmable Read-Only Memory ("EEPROM"), as well as volatile or nonvolatile memory. Thus, for example, the host 200 can transmit variable diagnostic data to memory portion 285 so that the transmitter assembly 216 can be reconfigured in operation. When doing so, the host 200 could relay diagnostic data over a 1-wire or 2-wire (e.g., "I$^2$C") serial bus, and payload data could be balanced (2 wires) or single-ended. In at least one embodiment, however, the memory components 280 and 285 are not included in the transmitter optical assembly 216.

The inventive transmitter assembly 216 can further include laser and Monitor Photo-Diode ("MPD") circuitry 215, where the laser circuitry can provide the laser diode 220 with data, and the MPD indicates critical laser diode 220 information to the laser control 210. For example, the MPD circuitry can indicate to the laser control 210 information such as how the laser diode 220 is performing at any given time. The modulator component 240 and bias component 250 could then receive the information from the MPD circuitry and provide the laser diode 220 with an appropriate current to maintain constant output.

The present transmitter assembly 216 can be additionally configured to work in several alternative embodiments. For example, the transmitter assembly 216 can be configured so that the laser control 210 IC primarily uses analog signaling. In such a case, the bias component 250 could be set by a laser-trimmed resistor (not shown), a digital potentiometer ("digital POT") (not shown), data in an EEPROM (e.g., memory component 285), or a One Time Programmable ("OTP") Digital to Analog Converter ("DAC"). In the analog embodiment, temperature compensation for the transmitter assembly 216 can be indicated by the temperature component 260, where the temperature component includes an analog temperature sensor.

Furthermore, in the analog signaling case, digital diagnostics would not be required, and so digital diagnostic data would not need to be stored in a memory component (e.g., 285). As well, the analog case would not need use of a transmission disable (i.e., "Tx Dis") line. The advantages to such an analog configuration include that the transmitter assembly 216 would be inexpensive to manufacture. In addition, no matching network between the IC and laser source 220 would be required, which would allow a much lower power requirements to drive the transmitter assembly 216.

In another alternative embodiment, the laser control 210 could implement both digital and analog signaling. In such a case, the bias component 250 and modulator component 240 could be setup to run in accordance with temperature compensation lookup tables that can be stored in one or more of the components in the laser control 210. For example, digital diagnostic information could be received and stored in memory component 285, though such digital diagnostic information would not be necessary to run the transmitter assembly 216.

In yet another alternative embodiment, the laser control 210 can be entirely digital with only minimal analog signaling. In such a case, the bias component 250 and modulation component 240 could receive commands directly from the current output at a DAC (not shown). In addition, all of the TOSA setup and temperature compensation could be based on, for example, temperature lookup tables, etc., and could be stored in one of the one or more of the memory components. The fully digital embodiment could be particularly suited to implement strong DAC output in the bias component 250, and suited to implement high speed amplification of a data transmission at the modulation component 240.

In each of the above-described embodiments, the laser control 210 can be connected directly to the laser source (e.g., laser diode) using bond wires, such as gold bond wires. Bond wires can be particularly useful with the present invention since they allow a relatively high data transmission rate with minimal impedance, and since they embody fewer "stray parasitics" by comparison with standard circuit traces. Furthermore, the shortened distance between the above-described active circuitry and the laser source 220 provides at least two benefits. For one, the shortened distance minimizes the effects of any discontinuities that would otherwise occur for high frequency data transmissions at longer lengths since the shortened distance is much less than the wavelength of the electronic data. Second, the shorter distance allows connections between the active circuitry and laser source 220 with far fewer changes in the conductive path shape (i.e., discontinuities) than would otherwise be present.

Figure 2C:
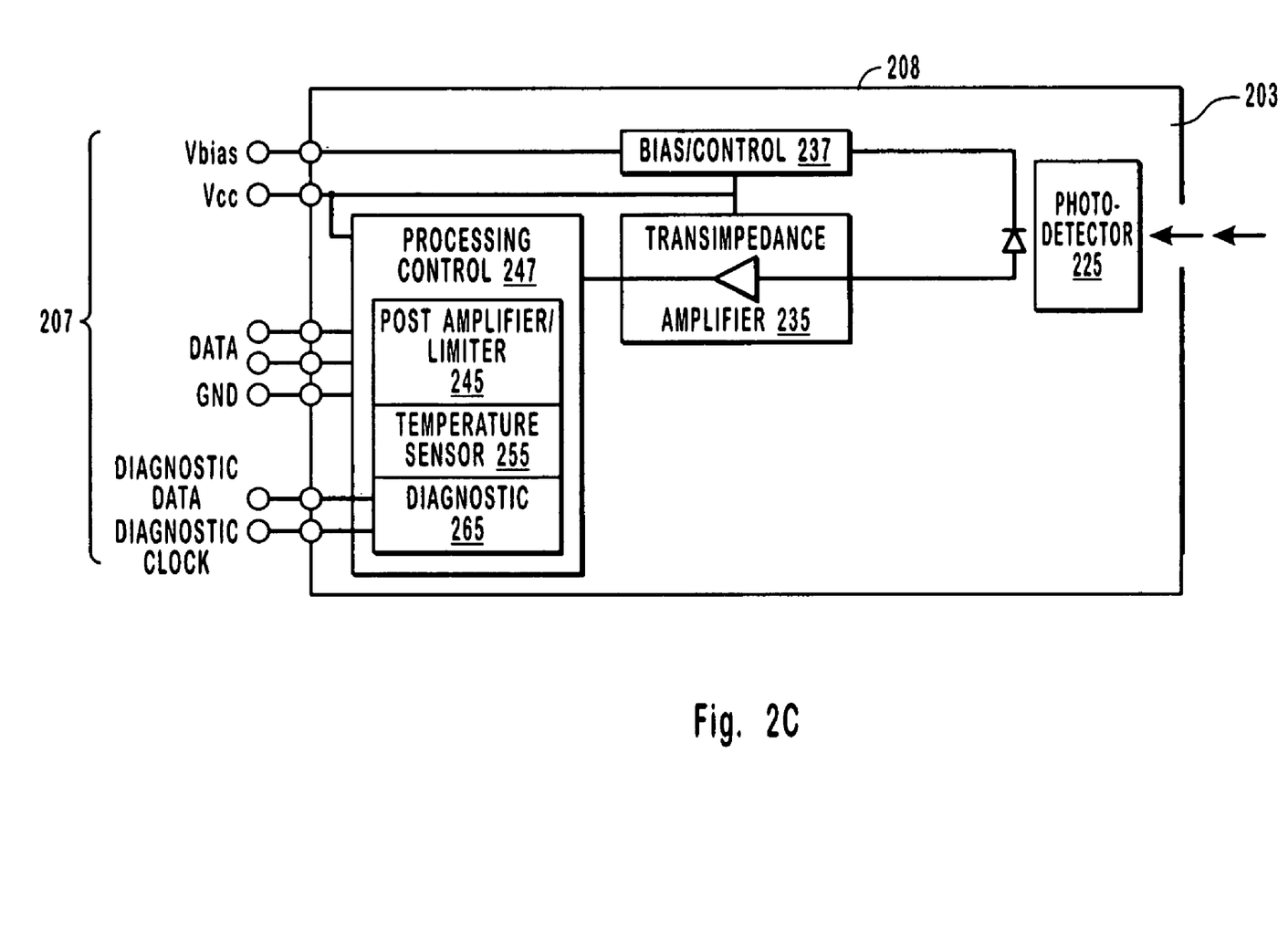

FIG. 2C is an expanded schematic diagram of the receiver assembly 208 shown in FIG. 2A, in accordance with at least one embodiment of the present invention. In the illustrated embodiment, a receiver optical assembly (e.g., a receiver assembly 208) includes a photo detector 225 (such as a photodiode) for receiving an optical signal off of a fiber optic network, where the photo detector 225 is placed on a receiver substrate 203. As with the transmitter optical assembly 216, the receiver substrate can be any type of integrated circuit, though SFF and SFP circuitry can be particularly useful. In at least one preferred embodiment, the substrate can be composed primarily of ceramic material that has been molded for embedded metallic circuit traces, and wherein the metallic circuit traces are enclosed in three-dimensional metallic sputtering.

The receiver optical assembly 208 includes a processing control 247 mounted on the receiver substrate, where the processing control 245 is communicably connected with the photo detector 225, as well as power and transmission/reception lines 207 from the host computer CPU 200. In one embodiment, the receiver optical assembly 208 can connect to the host 200 as an edge connector. For example, the receiver assembly 208 can include electrically conductive pins that allow a fitted, slidable connection with another electrical component, such as in the case of a typical PCI card that is connected to a host's motherboard.

The processing control 247 in the receiver optical assembly 208 can include one or more components for administering the received optical signals such as a temperature sensor 250, a post-amplifier/limiter 245, and one or more memory portions (not shown) for storing and receiving, for example, diagnostic data received from the host 200. The receiver optical assembly can further include a transimpedance amplifier 235 that may or may not be mounted within the processing control component 245, and can include a bias component 237. The bias component 237 can be particularly useful when implementing an avalanche photo-diode, though the bias component 237 is generally an optional component to the receiver optical assembly 208.

The components for the receiver optical assembly 208 provide similar functions as in the transmitter optical assembly 216, though with some minor exceptions. For example, the transimpedance amplifier component 235 takes an optical signal received from the photo detector 225 and converts the optical signal into an electrical signal, which the transimpedance amplifier component 235 then forwards to the processing control 247. In addition, the post-amplifier/limiter 245 (in the processing control 247) amplifies the electrical signal as appropriate before passing the electrical signal onto the host 200. The temperature sensor component 255 and the memory component 265 can provide many of the same benefits as described above for the transmitter assembly 216, such as providing ongoing host control over how the receiver assembly 208 functions in response to environmental variables.

As also described with the transmitter assembly 216, the receiver assembly 208 can implement primarily analog signaling. In such a case, the postamp settings can include "Out Amplitude", a Loss of Signal ("LOS") threshold, and LOS hysteresis, etc. The post-amplifier/limiter 245 could be set by a laser-trimmed resistor (not shown), a digital potentiometer (not shown), data stored in a diagnostic component 265, or a one time programmable digital to analog converter (not shown). In addition, all of the ROSA setup and temperature compensation could be based on, for example, temperature lookup tables, etc. and could be stored in one of the one or more of the memory components. The fully digital embodiment could be particularly suited to implement strong DAC output in the bias component 237, and suited to implement high speed amplification of a data transmission via the processing control 247.

In each of the above-described embodiments for the receiver optical assembly 208, the photo detector 225 can be connected directly to the transimpedance amplifier 235 and processing control 245 using bond wires, such as gold bond wires. Bond wires can be particularly useful with the inventive receiver optical assembly since they allow a relatively high data transmission rate with minimal impedance, and since they embody fewer "stray parasitics" by comparison with standard circuit traces. Furthermore, the shortened distance between the above-described active circuitry and the photo-diode 225 provides at least two benefits. For one, the shortened distance minimizes the effects of any discontinuities that would otherwise occur for high frequency data transmissions at longer lengths since the shortened distance is much less than the wavelength of the electronic data. Second, the shorter distance allows connections between the active circuitry and photo-diode 225 with far fewer changes in the conductive path shape (i.e., discontinuities) than would otherwise be present.

Figure 3:
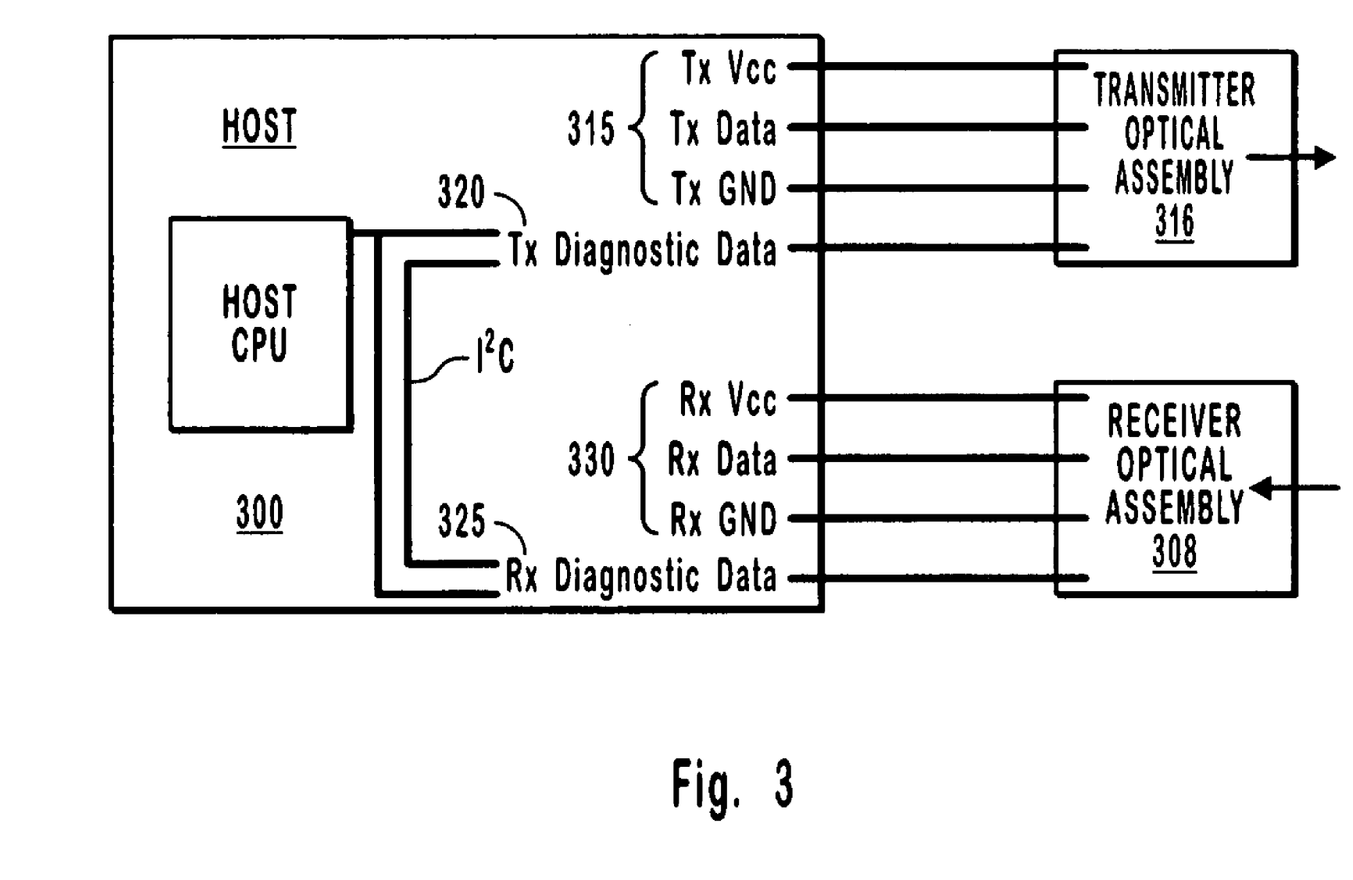
FIG. 3 illustrates a generalized overview of one or more integrated optical assemblies in relationship to a host.

FIG. 3 illustrates an overall schematic of the transmitter and receiver optical assemblies 316 and 308 connected to a host 300. As shown, a TOSA-host connection can include a set of lines 315, such as a power line ("Tx VCC"), a conductive path ("Tx Data"), and a ground line ("Tx GND"), generally corresponding to TOSA functionality. In some embodiments, the TOSA 316 can further include a diagnostic data line ("Tx Diagnostic Data" 320). As well, a ROSA-host connection can include a set of ROSA-specific lines 330 including a power line ("Rx VCC"), a conductive path ("Rx Data"), and a ground line ("Rx GND"), generally corresponding to ROSA functionality. In some embodiments, the ROSA 308 can further include a diagnostic data line ("Rx Diagnostic Data" 325). In both the TOSA 316 and ROSA 308, the diagnostic data line can relay diagnostic data in at least one embodiment over an $I^2C$ serial bus.

One will appreciate therefore that, in the system described in FIG. 3, some data can be unique to the TOSA 316, while other data can be unique to the ROSA 308. Similarly, different power levels may need to be delivered to each assembly on an individual basis. Accordingly, the invention provides for a split memory map. In such a case, the TOSA 316 will typically respond to bytes and bits relevant to the transmit functions, and the ROSA 308 will typically respond to bytes and bits relevant to the receive functions. One configuration includes the ROSA 308 receiving a sense an acknowledgment ("ACK") pulse from the TOSA 316. The ROSA 308 can sense an ACK by having a higher "ON" resistance in a data (e.g., Serial Clock data—SCL) driver than in the TOSA 316. A comparator (not shown) at the ROSA 308 could then sense if the TOSA 316 is "ACK-ing". If the TOSA 316 is absent (i.e., the ROSA 308 does not detect a pulse from the TOSA 316), the ROSA 308 (rather than the TOSA 316—default) can then provide common data.

Figure 4:
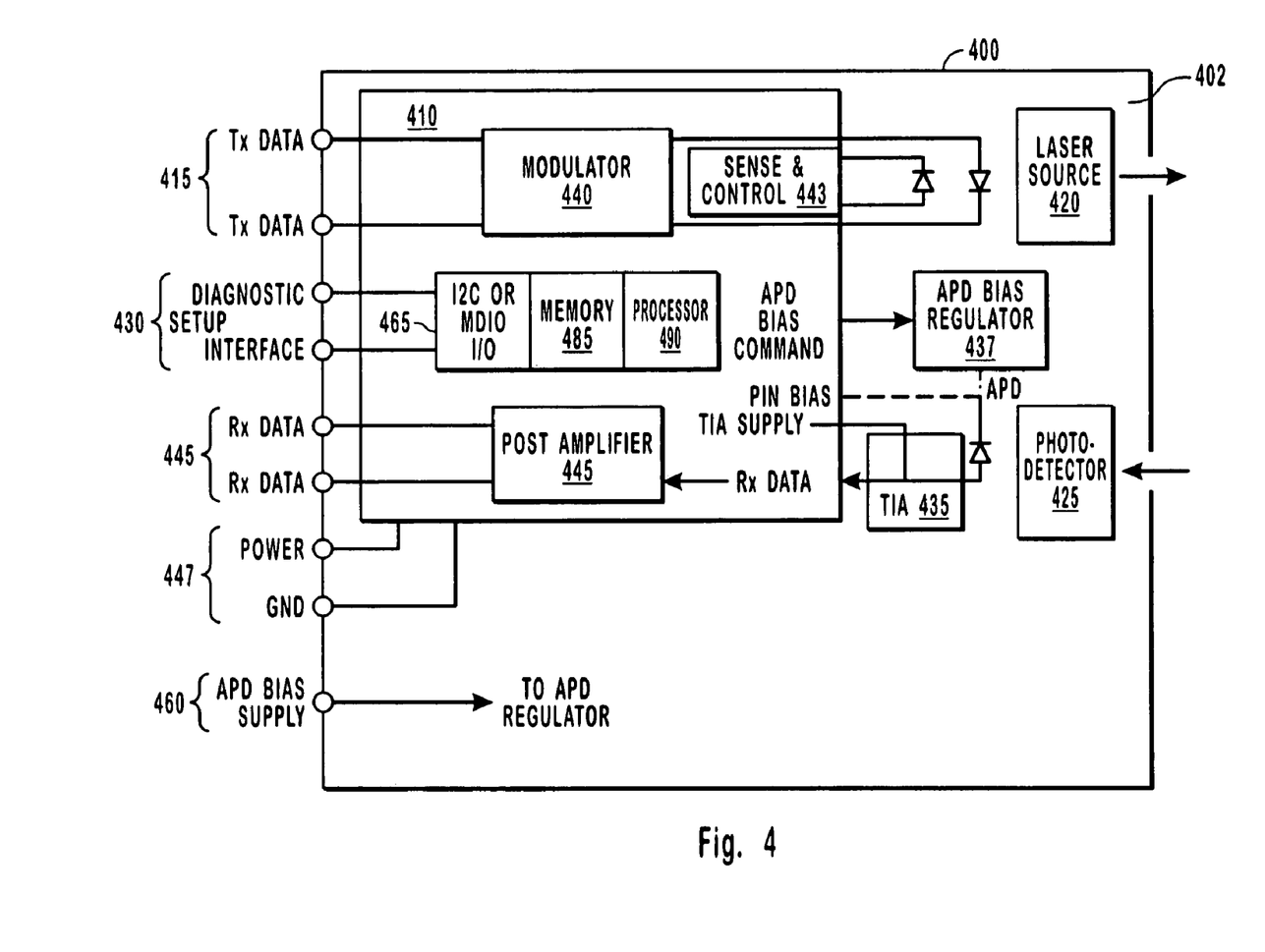
FIG. 4 illustrates one embodiment of a combined, integrated optical assembly that can be suitable both for sending and receiving optical signals.

FIG. 4 illustrates another preferred embodiment wherein a combined transmitter and receiver optical assembly (e.g., combined OSA) includes transmitter and receiver components, packaged into a single optical assembly. For example, the combined optical assembly 400 includes a laser source (e.g., laser diode) 420 and a photo detector 425 (e.g., a photodiode) mounted on a combination transmitter/receiver substrate IC 402, as well as connections for power and ground 447. In at least one preferred embodiment, the combination substrate IC 402 can be composed primarily of ceramic material that has been molded for embedded metallic circuit traces, and wherein the metallic circuit traces are enclosed in three-dimensional metallic sputtering.

The combined optical assembly can also include a processing control 410 mounted on the combination substrate, where the processing control 410 is communicably connected with the photo detector 425, and the laser source 420, as well as power and transmission/reception lines (e.g., 415, 430, 445, 447, 460) from the host. In at least one embodiment, this combined optical assembly 400 can replace a standard transceiver.

As with a receiver optical assembly 308 and a transmitter optical assembly 316, the combined optical assembly 400 can connect to the host 200 as an edge connector. For example, the combined optical assembly 400 can include electrically conductive pins that allow a fitted, slidable connection with another component, such as in the case of a typical PCI card that is connected to a host's motherboard. The processing control 410 in the combined optical assembly 400 can include one or more components for administering the transmitter and receiver components such as a modulator component 440. The modulator 440 can provide adjustable current to the laser source 420, and can include an interface to receive transmission lines 415 that transmit data from a host computer (e.g., host 200).

The combined optical assembly 400 can further include a sense and control component 443. In one embodiment, the sense and control component 443 can include a monitor photo-diode and related circuitry that coordinates status information with the laser source 420, as described above in the transmitter assembly 216. The combined optical assembly 400 can also include a processor component 490, and a postamp component 445. The processor component 490 can include one or more sets of instructions for administering the various components described herein on the combined optical assembly, wherein the instructions can include both static and continually updated instructions.

For example, the processor component 490 could include a set of setup instructions that are to be executed routinely upon startup, and could also continually receive new instructions for adjusting a component as requested from the host computer. In addition, the combined optical assembly 400 can include one or more memory portions for storing and receiving diagnostic data. In one embodiment, the processor component 490 and the one or more memory components 485 can receive diagnostic data from a host computer through diagnostic and setup interface lines 430 using an $I^2C$ or MDIO bus 465.

The processor component 490 can also send APD bias commands to the APD bias regulator 437, as will be discussed hereinafter. A PIN bias can be sent by the processor component 490 to set limits on power used by the various components, such as the laser source 420 and the photo detector 425. The combined optical assembly can further include a photo detector 425 and conversion components such as a transimpedance amplifier 435. As already described for the receiver optical assembly 208, the photo detector 425 can receive an optical signal off of a fiber optic network, and forward the optical signal to the transimpedance amplifier 435, which converts the optical signal into an electrical data signal.

Alternatively (or in addition to the transimpedance amplifier) the photo detector could send the optical signal to an APD component that includes an APD bias regulator component 437. The APD component would also convert the optical signal into an electrical data signal. The APD regulator component 437 can receive bias supply though a bias supply line 460. In any case, the APD regulator component 437 (or transimpedance amplifier component 435), sends the converted electrical data signal to the postamp 445. As with the above-described receiver optical assembly 216, the postamp 445 can amplify the electrical data signal as appropriate before relaying the electrical data signal to the host computer along receiving conductive paths 445. This integrated, combined optical assembly allows close proximity of electrical transmissions, and good sharing of several resources for lower total cost, and ease of manufacture.

In each of the above-described optical assemblies, compact components and/or modules (e.g., SFF and SFP components/modules) allow for close proximity between controlling components, intelligence-based components, and an optical transmitter and receiver all placed within the respective transmitter, receiver, and/or combination optical assembly. As already described for the transmitter and receiver optical assemblies, the combined optical assembly can therefore significantly reduce the impedance otherwise present in prior transceivers, and can therefore significantly reduce the need for adding matching components (as well as the power otherwise needed to amplify lost signals) along conductive paths. Thus, in some cases, the combined optical assembly can eliminate the need for a separate transceiver, which further allows for more efficient, more compacted fiber optic systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An assembly of a transmitter optical assembly, a receiver optical assembly and a host, comprising:
   the transmitter optical assembly including:
      a transmitter substrate that includes a transmitter power line and a transmitter conductive path coupled to a transmitter optical assembly connector;
      a laser source mounted on the transmitter substrate; and
      a transmitter integrated circuit mounted on the transmitter substrate, including:
         a laser control communicably connected with one or more of the laser source, the transmitter power line, and the transmitter conductive path, the laser control including a transmitter memory portion, the transmitter memory portion including one or more memory components for receiving or storing data;
   the receiver optical assembly including:
      a receiver substrate that includes a receiver power line and a receiver conductive path coupled to a receiver optical assembly connector;
      a photodiode mounted on the receiver substrate; and
      a receiver integrated circuit including:
         a processing control communicably connected with one or more of the photodiode, the receiver power line, and the receiver conductive path, the processing control including a receiver memory portion, the receiver memory portion including one or more memory components for receiving or storing data; and
   the host including:
      a host CPU;
      transmitter specific conductive lines configured to communicate electrical signals with the transmitter optical assembly; and
      receiver specific conductive lines configured to communicate electrical signals with the receiver optical assembly.

2. The assembly as recited in claim 1, wherein the laser control further includes a laser modulator, the laser modulator administering an alternating current from the laser control to the laser source; and a laser bias, the laser bias administering a direct current from the laser control to the laser source.

3. The assembly as recited in claim 1, wherein the transmitter substrate further includes connections for one or more of a ground line, a diagnostic data line, and a diagnostic clock.

4. The assembly as recited in claim 1, wherein the transmitter conductive path is a transmission line that carries data from the host to the transmitter optical assembly, wherein the data are ultimately transmitted at the laser source.

5. The assembly as recited in claim 1, wherein the transmitter substrate comprises ceramic materials, and wherein circuit traces on the ceramic materials include three-dimensional metallic sputtering to shield electromagnetic interference.

6. The assembly as recited in claim 1, the transmitter optical assembly further including a monitor photodiode, the monitor photodiode communicably connected with the laser source and the laser control, the monitor photodiode providing the laser control with status information about the laser source.

7. The assembly as recited in claim 1, wherein the transmitter memory portion comprises one or more of an LEPROM, and a RAM.

8. The assembly as recited in claim 7, wherein at least one of the one or more memory components of the transmitter memory portion includes a portion that stores one or more of status and fault information, and operating temperature information.

9. The assembly as recited in claim 7, wherein at least one of the one or more memory components of the transmitter memory portion includes a portion for receiving diagnostic data.

10. The assembly as recited in claim 1, wherein the processing control further includes a temperature sensor.

11. The assembly as recited in claim 1, wherein the photodiode is an avalanche photo-diode, the receiver optical assembly further including a bias control mounted on the receiver substrate, the bias control communicatively connected with the avalanche photo-diode, and the processing control.

12. The assembly as recited in claim 1, wherein the receiver conductive path is a data receiving line that carries data from the receiver optical assembly to the host.

13. The assembly as recited in claim 1, wherein the receiver substrate comprises ceramic materials, and wherein circuit traces on the ceramic materials include three-dimensional metallic sputtering to shield electromagnetic interference.

14. The assembly as recited in claim 1, wherein at least one of the one or more memory components of the receiver memory portion include one of an EEPROM, and a RAM.

15. The assembly as recited in claim 14, wherein at least one of the one or more memory components of the receiver memory portion includes a portion for receiving and storing diagnostic data.

16. The assembly as recited in claim 15, wherein the receiver substrate further comprises connections for one or more of a ground line, a diagnostic data line, and a diagnostic clock.

17. The assembly as recited in claim 1, wherein the laser control is connected directly to the laser source.

18. The assembly as recited in claim 1, further comprising a bond wire directly connecting the laser control to the laser source.

19. The assembly as recited in claim 1, wherein the processing control is directly connected to the photodetector.

20. The assembly as recited in claim 1, further comprising a transimpedance amplifier and a bond wire, wherein the photo detector is directly connected to the transimpedance amplifier or processing control by the bond wire.

21. The system of claim 1, wherein:
   the transmitter optical assembly connector includes an edge connector for electrically connecting to the transmitter specific conductive lines of the host;
   the receiver optical assembly further includes an edge connector for electrically connecting to the receiver specific conductive lines of the host; and
   the host includes:

a transmitter optical assembly receptacle for receiving the transmitter optical assembly's edge connector; and a receiver optical assembly receptacle for receiving the receiver optical assembly's edge connector.

22. The system of claim 1, wherein the laser control primarily uses analog signaling.

23. The system of claim 22, wherein the transmitter optical assembly does not store digital diagnostic data in the memory portion and no matching network is present between the transmit integrated circuit and the laser source.

24. An optical transceiver comprising:
   a combination transmitter and receiver substrate including a power line, at least one data transmission line, and at least one data reception line configured to connect to a host;
   a laser source mounted on the combination transmitter and receiver substrate;
   a photo detector mounted on the combination transmitter and receiver substrate; and
   a control integrated circuit mounted on the combination transmitter and receiver substrate including:
      a modulator configured to provide adjustable current to the laser source to transmit electrical data received from the host to the laser source;
      a post amplifier configured to receive received electrical data from the photo detector and amplify the received electrical data signal before relaying the electrical data signal to the host computer along the at least one data reception line; and
      a processor configured to receive diagnostic data from the host computer, the processor being incorporated in the integrated circuit along with the modulator and post amplifier, such that impedance that would otherwise be present in a high frequency electronic data communication is minimized due to the integration of the modulator, post amplifier, and processor in a common integrated circuit.

25. The optical transceiver of claim 24, farther comprising a transimpedance amplifier (TIA) mounted on the combination transmitter and receiver substrate, the integrated circuit farther including a TIA supply for supplying power to the TIA.

26. The optical transceiver of claim 25, wherein the photo detector includes an avalanche photodiode (APD) and the integrated circuit farther includes APD bias command control circuitry for sending commands to an APD regulator circuit mounted on the combination transmitter and receiver substrate.

27. The optical transceiver of claim 24, wherein the processor is configured to set limits on power used by the laser source and the photodetector.

28. The optical transceiver of claim 24, wherein the integrated circuit includes a sense and control component that communicates with a monitor photo-diode to provide status information to the processor regarding the laser source.

* * * * *

UNITED STATES PATENT AND TRADEMARK OFFICE
CERTIFICATE OF CORRECTION

PATENT NO. : 7,440,647 B2  Page 1 of 2
APPLICATION NO. : 10/828724
DATED : October 21, 2008
INVENTOR(S) : Lucy G. Hosking It is certified that error appears in the above-identified patent and that said Letters Patent is hereby corrected as shown below:

Title Page
Item (*), Term Adjustment, change "Subject to any disclaimer, the term of this patent is extended or adjusted under 35 U.S.C. 154(b) by 65 days" to --Subject to any disclaimer, the term of this patent is extended or adjusted under 35 U.S.C. 154(b) by 24 days--

Item (56), References Cited, Foreign Patent Documents, remove duplicate [WO02063800 A1 8/2002]

Item (56), References Cited, Foreign Patent Documents, add the following references:

| | | |
|---|---|---|
| --JP | 02102589 A | 4/1990 |
| JP | 04023373 A | 1/1992 |
| EP | 1471671 A2 | 10/2004 |
| JP | 58140175 A | 8/1983 |
| JP | 62124576 A | 6/1987 |
| JP | 62235975 A | 10/1987 |
| JP | 62281485 A | 12/1987 |
| WO | 93/21706 | 10/1993 |
| WO | 98/00893 | 1/1998 |
| WO | 02/063800 A1 | 8/2002 |
| WO | 2004/098100 A2 | 11/2004-- |

Item (56), References Cited, Other Publications, add the following references:
--Avella et al., "AN/ARC-144 UHF Multimode Transceiver", Sept. 1971, The Signal, pages 14-15.

Reiner Hausdorf, "Mobile transceiver measurements with Radiocommunication Service Monitor CMS", 1989, News from Rohde & Schwarz, Vol. 127, pages 5-7.

J. Mendez, "Circuito de Proteccion Contra Sobretensiones", 2003, Revista Espanola de Electronica, Vol. 31, No. 354, pages 37-39.

Signed and Sealed this

Twentieth Day of July, 2010

David J. Kappos
*Director of the United States Patent and Trademark Office*

Einwaechter et al., "Shortwave Transmitter & Receiver System FuG101 for Telegraphy and Telephony", 1976, Siemens Review, No. 12, pages 526-529.

Finisar Corporation, "Using the Finisar GBIC I2C Test/Diagnostics Port", 1998, AN-2025, pages 1-16.--

Item (57), Abstract, change "A receiver optical assembly includes a photodiode an optical converter, such as" to --A receiver optical assembly includes a photodiode, an optical converter, such as--

Column 2
Line 14, change "Post amp 100" to --Post amp 110--
Line 19, change "RX+ and RX- 120" to --RX+ and RX- 130--

Column 5
Line 62, change "Peripheral Component Interconnect ("PCI"3)" to --Peripheral Component Interconnect ("PCI")--

Column 7
Line 67, change "processing control 245" to --processing control 247--

Column 8
Line 11, change "temperature sensor 250" to --temperature sensor 255--
Lines 16-17, change "processing control component 245" to --processing control component 247--
Lines 32-33, change "memory component 265" to --memory component (not shown)--
Line 56, change "processing control 245" to --processing control 247--

Column 9
Lines 60-61, change "receiver optical assembly 308 and transmitter optical assembly 316" to --receiver optical assembly 208 and transmitter optical assembly 216--

Column 10
Line 51, change "receiver optical assembly 216" to --receiver optical assembly 208--

Column 12
Claim 7, lines 11-12, change "LEPROM" to --EEPROM--

Column 14
Claim 25, line 10, change "farther" to --further--